United States Patent [19]

Dacus

[11] Patent Number: 4,725,366
[45] Date of Patent: Feb. 16, 1988

[54] RAKE MOVEMENT SPEED CONTROL

[75] Inventor: Jeffrey K. Dacus, Greer, S.C.

[73] Assignee: Dresser Industries, Inc., Dallas, Tex.

[21] Appl. No.: 854,461

[22] Filed: Apr. 21, 1986

[51] Int. Cl.$^4$ .............................................. B01D 29/04
[52] U.S. Cl. .................................. 210/791; 210/159; 210/415; 55/296
[58] Field of Search ............... 210/159, 407, 413, 415, 210/523, 527, 531, 791; 55/295, 296, 297

[56] References Cited

U.S. PATENT DOCUMENTS

| | | | |
|---|---|---|---|
| 2,128,347 | 8/1938 | Briggs | 210/176 |
| 3,358,837 | 12/1969 | Tillett et al. | 210/159 |
| 3,482,698 | 12/1969 | Östnäs | 210/159 |
| 3,591,006 | 7/1971 | Daferner | 210/159 |
| 4,265,750 | 5/1981 | Meonier | 210/159 |

OTHER PUBLICATIONS

Manual for Installation, Operating, and Maintenance Instructions for Jeffrey Cantenary Bar Screen with Shaft Mounted Reducer, issued Dec., 1985 including Sections I, II, III and IV, No. 241169.
Modern Industries Inc., "Modern Motion Controls", Erie, Penn., Sep. 1980.

Primary Examiner—Richard V. Fisher
Assistant Examiner—Jeffrey W. Peterson
Attorney, Agent, or Firm—Sigalos & Levine

[57] ABSTRACT

The present invention relates to a raking apparatus which has at least an upper section and a rake section rotatably coupled to the upper section for rotatable movement from a first position spaced from the bar screen to a second position for removing debris from the bar screen. The rake section moves from the first position to the second position under the influence of a counterweight or other biasing force. A shock absorber placed between the rake section and the upper section controls the forward motion of the rake section to prevent damage to the rake apparatus from uncontrolled forward movement of the rake section from the first position to the second position.

14 Claims, 11 Drawing Figures

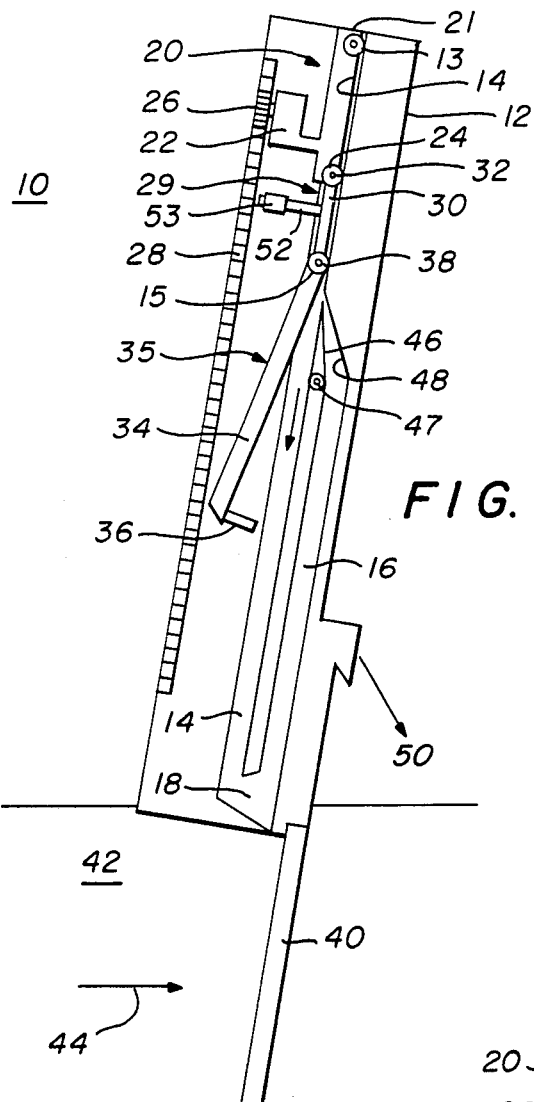
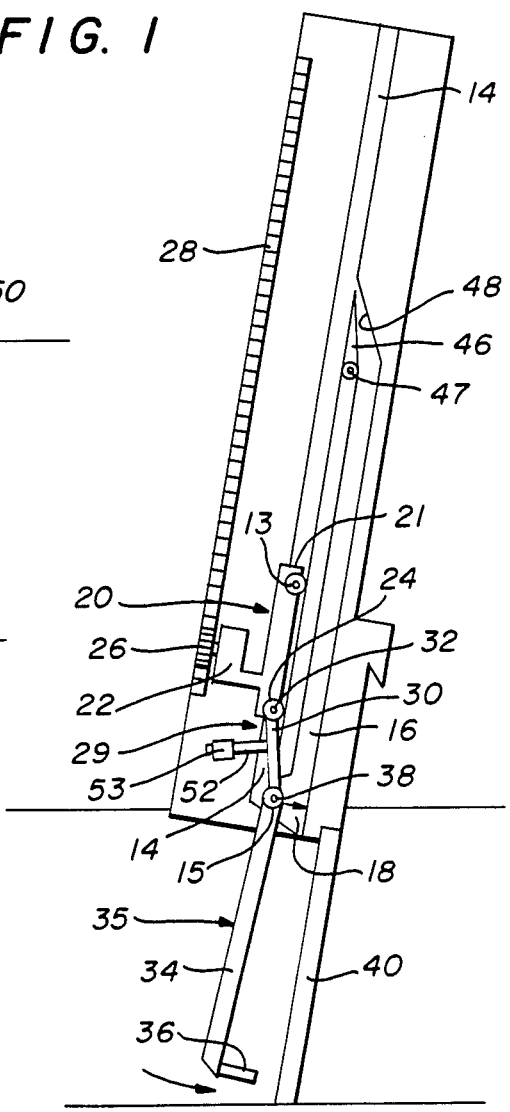
FIG. 1
FIG. 2

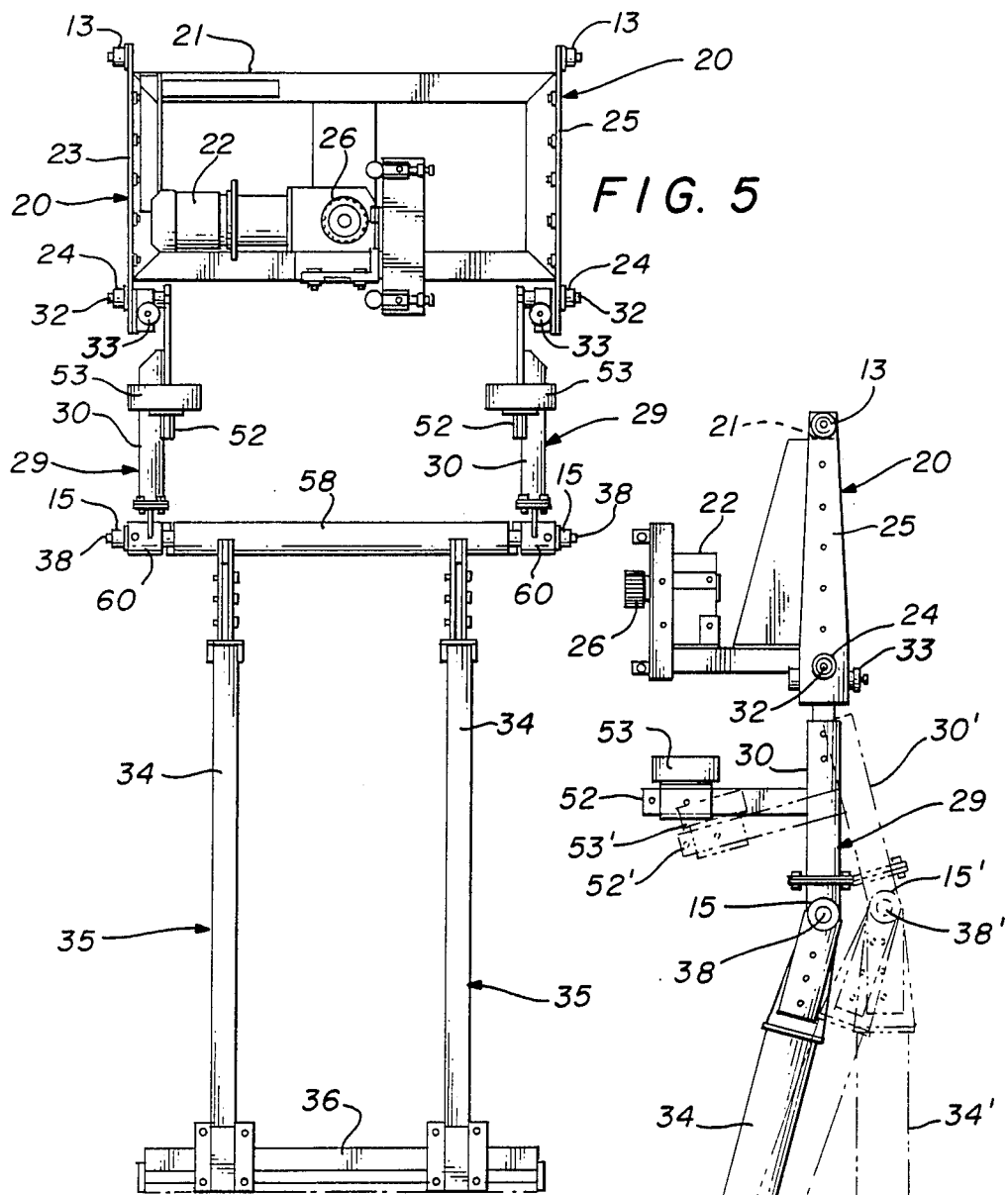
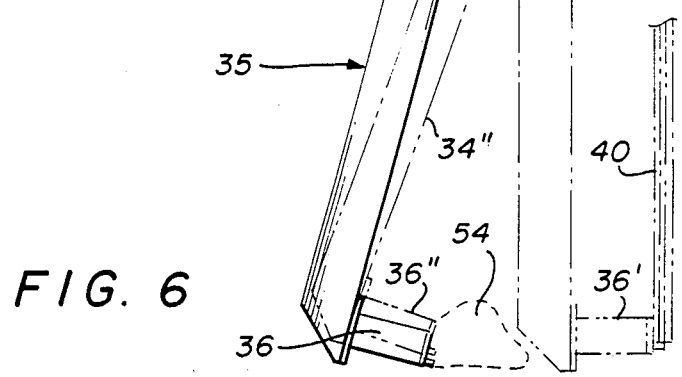
FIG. 5
FIG. 6

RAKE MOVEMENT SPEED CONTROL

BACKGROUND OF THE INVENTION

The present invention relates to a motorized rake assembly that, in conjunction with a bar screen located in a fluid canal or channel to catch and retain debris from the flowing fluid intermittently enters the channel to rake the screen bars and remove any trapped material. The rake contacts the trapped material and then ascends from the fluid channel to remove the material from the screen and elevate it to a discharge point. In particular, the present invention relates to such a raking apparatus which has at least an upper section and a rake section rotatably coupled to the upper section for rotatable movement from a first position spaced from the bar screen to a second position for removing debris from the bar screen. The rake section moves from the first position to the second position under the influence of a counterweight or other biasing force. A shock absorber placed between the rake section and the upper section controls the forward motion of the rake section to prevent damage to the rake apparatus from uncontrolled forward movement of the rake section from the first position to the second position.

It is necessary in many applications where a fluid or liquid such as water is confined to a channel, and which has debris in the fluid which must be periodically removed from a debris catcher such as a bar screen, to provide an automatic device for removing the debris which accumulates against the screen as necessary from time to time. These devices include some type of a rake which can be intermittently lowered into the fluid carrying channel to engage the debris retained or trapped by the bar screen and then moved upwardly out of the channel pulling the debris with the rake. When the rake has elevated the debris to the discharge point, some type of automatic device, well known in the art, scrapes the rake free of the debris and the rake may then be lowered back into the fluid where it again engages the debris retained by the bar screen to remove it from the liquid channel.

One of the problems associated with the prior art is the fact that the rake section must be forced in the direction of the bar screen with sufficient force to allow the rake teeth to penetrate the debris that is caught by the bar screen and allow it to be removed from the channel. The means of forcing the rake section in the direction of the bar screen varies but usually has some type of a counterweight which applies an extra force to the rake section in addition to the weight of the rake itself to force it in the direction of the bar screen. In addition, of course, if the rake section is moving in the direction of any fluid flow in the channel the pressure from the fluid flow in the channel also contributes to forcing the rake section towards the bar screen. Serious problems can occur when the rake section comes forward with considerable force applied to it and an impact against the bar screen can be damaging not only to the rake equipment but also to the bar screen. In addition, if an obstacle is caught in the channel between the bar screen and the approaching rake, the force of the rake striking the obstacle may also cause damage to the rake apparatus.

In the present invention, the rake assembly travels downwardly into the fluid channel along a first guide track or channel in a frame assembly, moves forward in a transition guide track to a second guide track parallel to the first and travels back up the second guide track to its initial position while raking the screen during the return travel.

The present invention reduces the falling force of the rake in its transition from the first guide track to the second guide track for engagement with the bar rake. This is accomplished with a shock absorber placed between the rake section and the upper section which not only reduces the impact force at the transition to the second guide track, but also controls the speed of transition from the first guide track to the second guide track.

More particularly, a rotary shock absorber is attached between the upper section and the midsection to control the force of counterweights attached to the midsection which force the midsection to rotate about its pivot point with the upper section where the rotary shock absorbers are located. The lower section or rake section is pivotally attached to the midsection to allow the midsection with its counterweights to carry the lower rake section forward in the direction of the bar screen.

Thus, it is an object of the present invention to reduce the impact of the rake section against either debris or the bar screen.

It is also an object of the present invention to reduce the falling force of the rake section in its transition from the first to the second guide track for engagement of the rake with the bar screen.

It is still another object of the present invention to control the speed of transition of the rake section from the first to the second guide track for engagement with either debris or the bar screen.

It is still another object of the present invention to utilize a shock absorber, and, in particular, a rotary shock absorber, between the upper section and the rake section to control the transition speed and impact of the rake section as it travels from a first position spaced from said bar screen to a second position for engagement with debris or the bar screen.

SUMMARY OF THE INVENTION

Thus, the present invention relates to an improved raking apparatus for use in connection with a bar screen in a fluid carrying channel to remove debris from said screen, said rake apparatus having an upper section for movement toward and away from said fluid carrying channel, a rake section, with a rake thereon, rotatably coupled to said upper section for rotatable movement from a first position spaced from said bar screen to a second position for removing debris from said bar screen, and a shock absorber coupling said upper section to said rotatable rake section to control the speed of rotatable movement of said rake member from said first position to said second position to protect said rake apparatus from damage from uncontrolled forward motion of said rake section.

The present invention also relates to an improved rake apparatus for use in connection with a bar screen in a fluid carrying channel to remove debris from said screen, said rake apparatus having an upper section, and a lower rake section rotatable with respect to said upper section, the improvement comprising a midsection interposed between said upper section and said lower rake section, said midsection being rotatably attached to said upper section and pivotally attached to and carrying said lower rake section, from a first position spaced from said bar screen to a second position for removing debris from said bar screen, and a shock absorber coupled between said upper section and said rotatable midsection whereby rotatable motion of said midsection is controlled by said shock absorber to protect said rake apparatus from damage from uncontrolled motion of said midsection and its attached lower rake section from said first position to said second position.

The invention also relates to a method of raking debris from a bar screen in a fluid carrying channel comprising the steps of moving an upper section of a raking apparatus toward and away from a fluid carrying channel, rotatably coupling a rake section with a rake thereon to said upper section for rotatable movement from a first position spaced from said bar screen to a second position for removing debris from said bar screen, and coupling a shock absorber between said upper section and said rake section to control the rotatable speed of said rake section during travel from said first to said second position to prevent damage to said rake apparatus from uncontrolled movement of said rake section.

BRIEF DESCRIPTION OF THE DRAWINGS

These and other objects of the present invention will be more clearly disclosed in connection with the accompanying drawings in which:

FIG. 1 is a schematic representation of the novel raking structure in its upper most position with guide wheels in a first guide track whereby it may begin its downward descent into the fluid carrying channel;

FIG. 2 is a schematic representation of the novel raking apparatus in its downward position in which the midsection or control assembly is pivoting with respect to the upper section by moving forward in a transition guide track and allowing the lower rake section to move into contact with debris collected by the bar screen;

FIG. 5 is a plan view of the raking structure illustrating the upper portion with the drive motor thereon, the pivotal midsection coupled thereto by means of rotary shock absorbers and having arms for counterweights thereon to force said rake from its first position spaced from said bar screen to its second position for removing debris from said bar screen and the lower section which is pivotally attached to the midsection and also which has the rake attached thereto;

FIG. 6 is a side view of the novel raking structure of FIG. 5 showing the rake in several of its possible positions with the rotary shock absorber positioned between the upper section and the midsection;

DETAILED DESCRIPTION OF THE DRAWINGS

Figure 3:
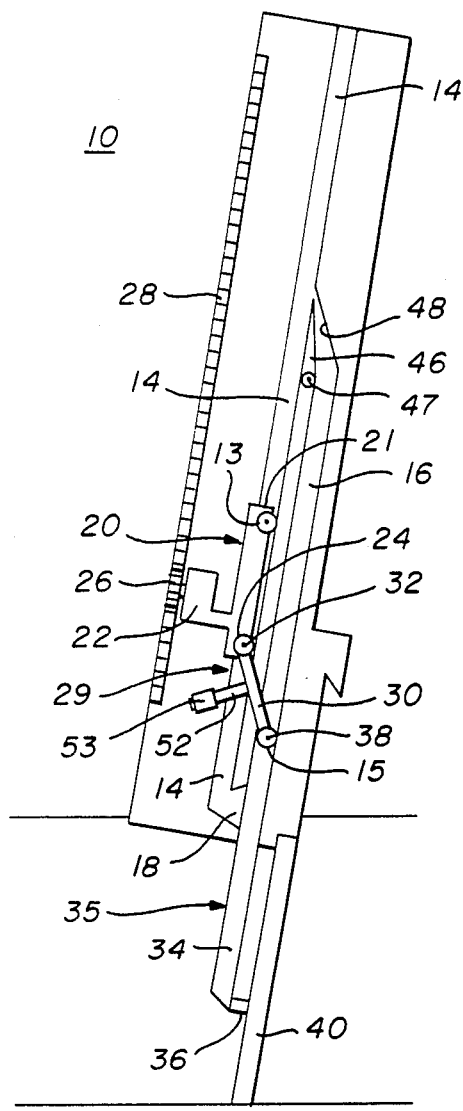
FIG. 3 is a schematic representation of the novel raking apparatus as it begins its upward movement with the guide wheels of the rake control apparatus now in a second guide track parallel to and spaced from the first guide track for upward movement bringing the rake upward while it rests against the bar rack thus removing the debris.

The novel raking structure is designated by the numeral 10 as shown in FIG. 1 and comprises a frame structure 12 having a first guide track 14 thereon for receiving guide rollers or wheels 13 of a first upper section 20 for up and down movement in said guide track 14. It will be noted that frame 12 slopes to the right in FIG. 1 with respect to fluid channel 42 thus causing guide track 14 to slope accordingly although the frame 12 could be positioned vertically with respect to fluid channel 42. A second sloping guide track 16 is formed parallel to and spaced from said first guide track 14 in the direction of bar screen 40 as indicated by arrow 44. It will be noted that second guide track 16 extends slightly below first guide track 14.

Raking structure 10 has a midsection 29 rotatably attached to the upper section 20 at pivot point 32 about which guide wheel 24 is located. A lower section, which is the rake assembly 35, is pivotally attached at point 38 to the lower portion of midsection or rake control assembly 29. Further, another guide wheel 15 is located at pivot point 38 and is guided by guide track 14. A drive motor 22 is attached to the upper portion 20 to turn a gear 26 which is engaged with a gear rack 28 to cause the structure 10 to move downwardly into fluid channel 42.

When the structure 10 has reached the bottom of its travel, guide wheel 15 on the rake control assembly 29 moves from the lower end of the first guide track 14 through transition guide track 18 to the lower end of the second guide track 16 thus carrying with it the rake assembly 35.

This position is shown in FIG. 2 in which the rake structure 10 is now at its lower most position with respect to frame 12 with the guide wheel 15 moving through guide track 18 from the bottom of guide track 14 to the bottom of guide track 16. As can be seen, rake assembly 35 now moves in a direction towards bar screen 40 where rake teeth 36 can contact and lift any debris that may be associated with bar screen 40.

FIG. 3 illustrates the raking structure 10 in its raking position as the assembly begins to move upwardly raking the debris from the screen 40 with teeth 36. It will be noted that guide wheel 24 of upper structure 20 remains in guide track 14 while guide wheel 15 of the midsection or control assembly 29 is now in parallel guide track 16. As the structure 10 continues upwardly, it will come to a point where guide wheel 15 on control assembly 29 will reach a slanted or sloped shoulder 48 which guides wheel 15 into a hinged gate 46 which is allowed to open only to the left in FIG. 3 into guide track 14. This allows wheel 15 to enter track 14 by control assembly 29 pivoting about pivot point 32 where the control assembly 29 is pivotally attached to the upper assembly 20. At the same time, means well known in the art remove the debris from the rake teeth 36 and discharges it at 50. Since such discharge apparatus is old and well known in the art and is not part of the present invention, it has not been shown in detail in this application.

Thus, the raking structure 10 returns to its uppermost position with all three guide wheels 13, 15 and 24 now in track 14 ready for the downward movement of the raking structure 10 to repeat the process.

Figure 4:
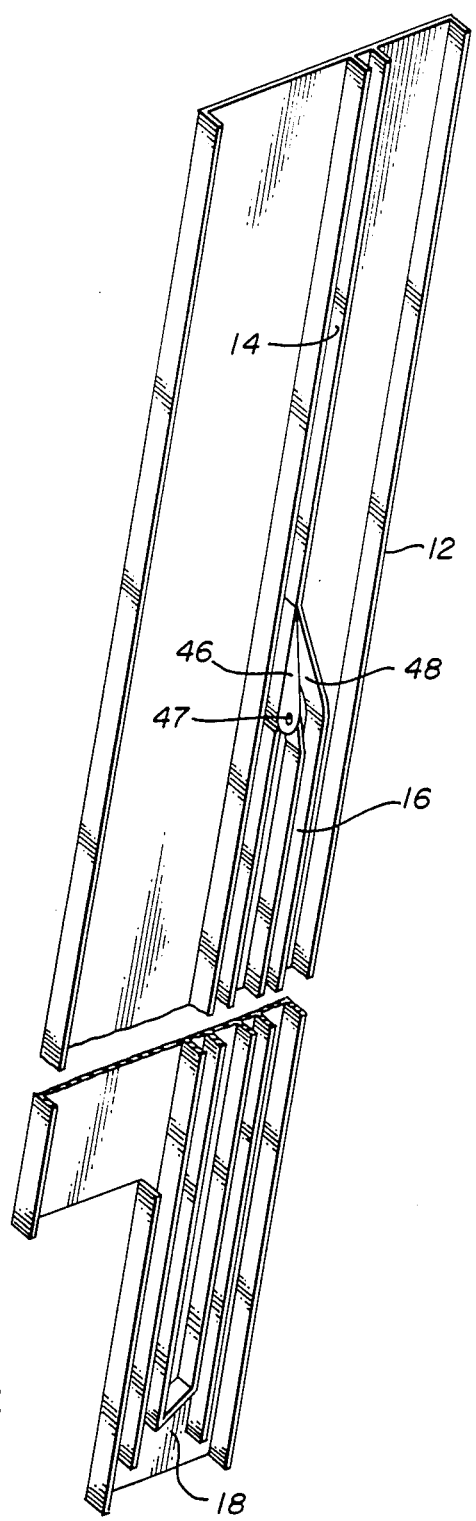
FIG. 4 is a partial schematic representation of one side of the mounting frame illustrating the first and second parallel sloping guide tracks which receive the guide rollers or wheels of the upper section and the pivotable midsection and which allow the rollers of the midsection to follow the first guide track to the bottom of its travel path and then move forward in a transition guide track into the second guide track for upward movement through a pivotal gate into the first guide track as it approaches the top of its travel.

FIG. 4 is a schematic representation of one of the sides of frame 12 illustrating tracks 14 and 16 and the hinged gate 46 which allows the appropriate guide wheel to travel down track 14, through track 18 to the spaced track 16, and upward in track 16 to pivotable door 46 which pivots about point 47 and opens into track 14 thus allowing the guide wheel to return to track 14 thereby enabling the process to repeat itself.

FIG. 5 is a plan view of the novel raking structure 10. As can be seen in FIG. 5, upper section 20 has bar 21 with depending spaced arms 23 and 25 and has guide wheels 13 at the upper corners thereof and a drive motor 22 mounted thereon for driving a gear 26. The midsection or control assembly 29 has fixed supports 60 with spaced arms 30 extending upward and is rotatably attached to the upper section 20 at center lines 32 by a rotary shock absorber 33 to protect the rake structure from damage from uncontrolled forward motion of said midsection 29 and its attached lower rake section 35 as guide wheels 15 thereon make the transition travel from track 14 to track 16 through connecting track 18. Guide wheels 24 are also rotatably located on center line 32.

The lower portion or rake assembly 35 has a pair of arms 34 pivotally attached to the lower end of the midsection or control assembly 29 through arm 58 at pivot points 38. Guide wheels 15 are also formed about pivot points 38 as indicated earlier to guide the lower end of midsection 29 in its transition from track 14 to track 16 through connecting track 18. The rake 36 is attached to the pair of rake assembly arms 34 as indicated.

FIG. 6 is a side view of the novel rake structure shown in FIG. 5 and illustrating the movement of the control assembly 29 and rake assembly 35 when the rake structure 10 reaches the lower most portion of its travel. Thus, as has been explained with respect to FIG. 1, as the rake structure 10 travels down the guide track 14 toward its lowest position, the midsection or control assembly 29 remains aligned with the upper portion 20 while the rake assembly 35 is held at an angle to control assembly 29 by means of projections 62 and 64 at the pivot point thereof which will be discussed further in relation to FIGS. 8, 9, 10 and 11. When the rake structure 10 reaches the bottom of its travel as indicated in FIG. 2, the guide wheel 15 drops out of track 14 and travels forward through track 18 to track 16 as shown in FIG. 2. This forward motion is controlled and restrained by rotary shock absorbers 33 as explained earlier to prevent damage to the entire structure as said guide wheels strike track 16 or rake teeth 36 strike bar screen 40 or debris associated therewith. The result as indicated in FIG. 6 shows that rake control 29 pivots about pivot point 32 and assumes the position shown by the arms at 30'. It carries with it the rake assembly 35 which assumes the position shown by the arms at 34' where the rake teeth 36' are in contact with the bar screen 40 to remove any retained debris thereon. The assembly then moves upwardly as described previously in relation to FIG. 3.

Figure 7:
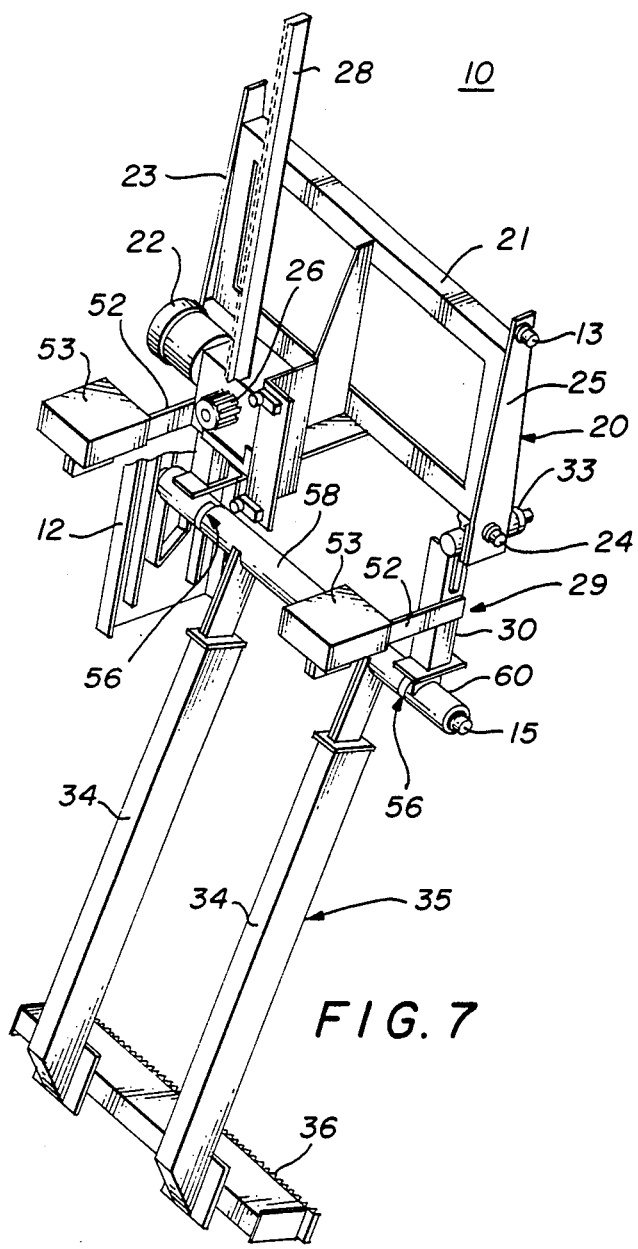
FIG. 7 is an isometric view of the novel raking structure illustrating the gear rack which is operatively associated with a gear driven by the power source on the upper frame section for driving the assembly up and down into and out of the fluid channel and also illustrating the counterweights on the midsection for causing the midsection and the lower section to move from the first position spaced from said bar screen to its second position from removing debris from the bar screen.

When control assembly 29 pivots about pivot point 32 so that arms 30 assume position 30' in FIG. 6, a pair of counterweights 53 shown in FIG. 7 on arms 52 actually assist the combined weight control assembly 29 and rake assembly 35 as well as any pressure from fluid flow on rake assembly 35 (if the fluid flow is in the same direction as the movement of the rake assembly 35) in forcing assemblies 29 and 35 to the right in FIG. 6. As can be understood, the combined weight of assemblies 29 and 35, (and any pressure from fluid flow on assembly 35) and counterweights 53 cause the assemblies 29 and 35 to move with great force. A sudden stop by rake teeth 36 striking bar 40 or some other obstacle or wheel 15 reaching the end of transition track 18 may cause a severe jolt which could damage some elements of the system.

Therefore, a shock absorber 33 is placed at the pivot point 32 on each side of the structure to absorb some of the load of assemblies 29 and 35 as they rotate with respect to upper section 20. In the construction shown, rotary shock absorbers 33 are used. Such a rotary shock absorber 33 may be of any well known type and are commercially available. Obviously, with a different type construction as where the pivot point 32 for midsection 29 was moved structurally to the left in FIG. 6, frame 20 arms 23 and 25 could be extended downwardly and a linear shock absorber of proper size inserted between the extended arms 23 and 25 and the rearwardly moved midsection 29. The important concept is to protect the apparatus from damage caused by sudden stops as powerful forces move control assembly 29 and rake assembly 35 toward bar screen 40.

Note in FIG. 6 that the rake assembly 35 is held at an angle with respect to midsection or control assembly 29. Note also with that angle maintained intact, as the control assembly 29 moves forward to the position shown by the arms at 30', rake assembly arms 34' are now in a proper position to clean bar screen 40.

Assume, however, that an obstacle 54 which is too large to be removed by the rake assembly 35 in one encounter is contacted by teeth 36. As the control assembly 29 continues to move forward to assume the position shown by the arms at 30', the rake assembly 35 pivots at point 38 as it moves to point 38' to allow the rake assembly 35 to now assume the position shown by the dashed lines indicated as arms 34''. Thus, the teeth 36 of rake assembly 35 are stationary while pivot point 38 MOVES TO 38' thus preventing any damage from occurring to the equipment because of the rake teeth 36 suddenly, and with force, encountering an object which is too large for it to move. In such case, the teeth 36 will engage and remove that portion of the obstacle 54 that it can move and by repeating the process or cycle several times may be able in fact to remove all of the obstacle 54 before teeth 36 are allowed to abut or penetrate spaces between the bars of the bar screen 40. It will thus be seen that wear and tear on the equipment is minimized by removing the stresses that are applied to the system when the rake teeth 36 encounter an object which it cannot move in one cycle.

Arms 52 extending to the front of control assembly 29 have platforms thereon on which counterweights 53 shown in FIG. 7 may be placed to force control assembly 29 forward when guide wheel 15 reaches the bottom of track 14 and goes through track 18 to the bottom of track 16 before beginning its upward movement.

An isometric view of the rake structure 10 is illustrated in FIG. 7 in relation to gear rack 28 with counterbalances 53 mounted on arms 52 to force the midsection or control assembly 29 forward when guide wheels 15 reach the bottom of track 14 as described earlier. In addition, FIG. 7 illustrates a gap 56 between pivotal arm 58 on the rake structure 35 with respect to the fixed elements 60 on the central portion or control assembly 29. The jaw gap 56 is formed by complementary abutments on the ends of the arm 58 which forms a portion of the rake assembly 35 and the fixed portions 60 of the control assembly 29 both of which abutments or projections are arc shaped and extend for approximately 120°. These will be discussed more fully in conjunction with FIGS. 8, 9, 10 and 11. Suffice it to say that the abutments allow arm or tube 58 of rake assembly 35 to pivot clockwise with respect to the fixed portions 60 of control assembly 29 as shown by dashed lines 34' in FIG. 6 but hold rake assembly 35 in an initial position at an angle with respect to control assembly 29 under normal conditions as illustrated by solid lines 35 and dashed lines 34' in FIG. 6.

Figure 8:
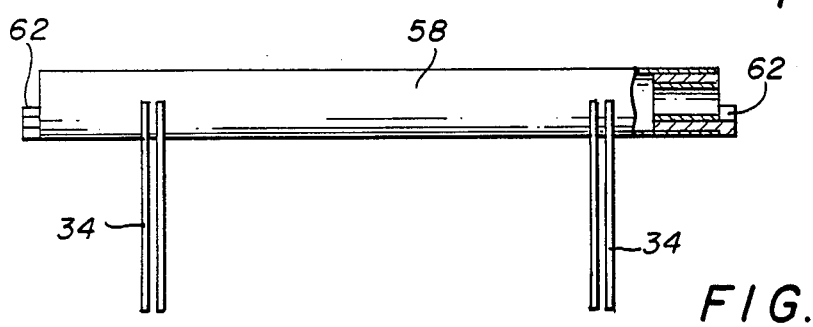
FIG. 8 is a rear view of the pivot point of the lower section illustrating projections on the ends thereof which are in the form of an arc of approximately 120° which engage a corresponding abutment or projection on the mating portion of the midsection thereby causing the lower section with the rake to be held at an angle with respect to the midsection and yet allowing the lower rake section to pivot rearwardly if the rake attached thereto strikes an obstacle.

The tube or arm 58 which forms a part of the rake assembly 35 is illustrated in FIG. 8. It will be noted that on each end thereof is a projection 62. Note in FIG. 9 that the projection 62 is in the shape of an arc and extends for approximately 120°.

Figure 10:
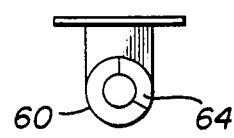
FIG. 10 is an end view of the mating 120° arc projection on the midsection which cooperates with the abutment shown in FIG. 8 and FIG. 9 to hold the lower portion of the frame at an angle with respect to the midportion of the frame and yet which allows the lower rake portion to pivot rearwardly with respect to the midsection.
Figure 11:
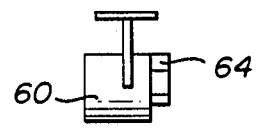
FIG. 11 is a side view of the projection shown in FIG. 10.
Figure 9:
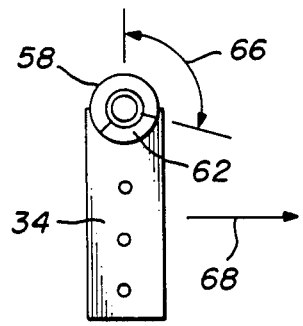
FIG. 9 is an end view of the pivot point illustrated in FIG. 8 showing the 120° arc projection thereon.

The matching abutment or projection 64 is shown in FIGS. 10 and 11 wherein in FIG. 10 the abutment 64 is shown as an end view while in FIG. 11 it is shown as a side view. Note that the abutment 64 also encompasses an arc of 120° and is positioned such that it mates with abutment 62 in a complementary manner and is positioned in the 120° segment of FIG. 9 indicated by arrow 66. Thus, because abutment 62 normally rests against abutment 64, the rake assembly 35 cannot move in the counterclockwise direction. Assuming that arrow 68 in FIG. 9 is in the direction toward bar screen 40 and also assuming that abutment 64 is positioned as indicated by the arrow 66 in a complementary relationship with abutment 62, it will be realized that abutment 62 can rotate in a clockwise direction away from abutment 66 but cannot move further in a counterclockwise direction since it already abuts projection or abutment 64. Thus, rake assembly 35 is allowed to pivot to the rear if the rake teeth 36 in FIGS. 6 or 7 strike an obstacle which cannot be moved but it cannot rotate counterclockwise from its initial position with relation to control assembly 29 because of the abutments 64.

Thus, there has been disclosed a novel rake structure for cleaning debris from a bar screen in a liquid carrying channel having an upper section for movement toward and away from said fluid carrying channel, a rake section rotatably coupled to the upper section and having a rake thereon for rotational movement toward said bar screen to remove the debris thereon, means for forcing the rake section to rotate from a first position spaced from said bar screen to a second position for removing debris from said bar screen and a shock absorber positioned between the upper section and the rotatable rake section to control the speed of rotatable movement of said rake member to protect the rake apparatus from damage from uncontrolled forward motion of the rake section from its first to its second position. The preferred shock absorber is of the rotatable type; however, linear shock absorbers could be utilized by making minor adjustments in the manner in which the rake section is coupled to the upper section.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined by the appended claims.

What is claimed is:

1. In a rake apparatus for use with a bar screen in a fluid carrying channel to remove debris from said screen, said rake apparatus having an upper section and a lower rake section rotatable with respect to said upper section, the improvement comprising:
   a. means for moving said upper section towards and away from said channel
   b. a midsection interposed between said upper section and said lower rake section, said midsection being rotatably attached to said upper section for movement of said rake section from a first position spaced from said bar screen to a second position for removing debris from said bar screen and pivotally attached to and carrying said lower rake section, and
   c. a shock absorber coupled between said upper section and said rotatable midsection for controlling rotatable movement of said midsection to protect said rake apparatus from damage from uncontrolled movement of said midsection and its attached lower rake section from said first position to said second position.

2. A rake apparatus as in claim 1 for removing debris from a bar screen in a fluid carrying channel comprising:
   a. at least one arm depending from said upper section, and
   b. means for mounting said shock absorber between said upper section depending arm and said midsection whereby rotatable movement of said midsection relative to said upper section is controlled by said shock absorber.

3. A rake apparatus as in claim 2 wherein said shock absorber is a rotary shock absorber.

4. A rake apparatus as in claim 1 further comprising:
   a. first and second spaced arms depending from said upper section,
   b. first and second spaced arms extending from said midsection in an adjacent relationship with said depending arms, and
   c. a rotary shock absorber positioned between each depending arm and a corresponding adjacent extending arm for controlling rotatable movement of said midsection.

5. An improved rake apparatus for use in connection with a bar screen in a fluid carrying channel to remove debris from said screen, said apparatus comprising:

a. an upper section and means for movement of said upper section toward and away from said fluid carrying channel, b. a rake section with a rake thereon rotatably coupled to said upper section for rotatable movement from a first position spaced from said bar screen to a second position for removing debris from said bar screen, c. a midsection interposed between said upper section and said rake section, said midsection being rotatably attached to said upper section and pivotally attached to said rake section, and d. a shock absorber positioned between said upper section and said rotatable midsection to control the speed of rotatable movement of said rake section from said first position to said second position to protect said rake apparatus from damage from uncontrolled motion of said rake section toward said bar screen.

6. Apparatus as in claim 5 further including counterweight means attached to said midsection to force rotation of said rake section from said first position to said second position.

7. An improved rake apparatus as in claim 6 further comprising:

a. at least one arm depending from said upper section, b. at least one arm extending from said midsection to a point adjacent said at least one depending arm, and c. means for mounting said shock absorber between said adjacent depending and extending arms whereby rotatable movement of said rake section from said first position to said second position is controlled by said shock absorber.

8. An improved rake apparatus as in claim 7 wherein said shock absorber is a rotary shock absorber.

9. A rake apparatus as in claim 5 further comprising:

a. first and second spaced arms depending from said upper section, b. first and second spaced arms extending from said midsection in an adjacent relationship with said depending arms, and c. a rotary shock absorber positioned between each depending arm and a corresponding adjacent extending arm for controlling rotatable movement of said rake section.

10. A method of raking debris from a bar screen in a fluid carrying channel comprising the steps of:

a. moving an upper section of a raking apparatus toward and away from a fluid carrying channel, b. rotatably coupling a rake section with a rake thereon to said upper section for rotatable movement from a first position spaced from said bar screen to a second position for removing debris from said bar screen, c. interposing a midsection between said upper section and said rake section, said midsection being rotatably attached to said upper section and pivotally attached to said rake section, and d. coupling a shock absorber between said upper section and said midsection to control the rotatable speed of said rake section between said first and second positions to prevent damage to said rake apparatus.

11. The method of claim 10 further including the step of attaching a counterweight to said midsection to force rotation of said rake section from said first position to said second position.

12. The method of claim 11 further including the steps of:

a. depending at least one arm from said upper section, b. extending at least one arm from said midsection in an adjacent relationship with said depending arm, and c. mounting said shock absorber between said adjacent depending and extending arms whereby rotatable movement of said rake section from said first position to said second position is controlled by said shock absorber.

13. The method of claim 12 further comprising the step of utilizing a rotary shock absorber as said shock absorber.

14. The method of claim 10 further comprising the steps of:

a. depending first and second spaced arms from said upper section, b. extending first and second spaced arms from said midsection in an adjacent relationship with said depending arms, and c. positioning a rotary shock absorber between each depending arm and a corresponding adjacent extending arm for controlling rotatable movement of said midsection.

* * * * *